United States Patent Office 3,024,250
Patented Mar. 6, 1962

3,024,250
α-HYDROXY-β,β-DIMETHYL-γ-BUTYROLACTONE AND A PROCESS FOR PRODUCING SAME
Howard C. Klein, Brooklyn, N.Y., assignor to Nopco Chemical Company, Harrison, N.J., a corporation of New Jersey
No Drawing. Filed Jan. 29, 1958, Ser. No. 711,814
6 Claims. (Cl. 260—343.6)

This invention relates, in general, to α-hydroxy-β,β-dimethyl-γ-butyrolactone. More particularly, the invention relates to improvements in the process for producing α-hydroxy-β,β-dimethyl-γ-butyrolactone.

α-Hydroxy-β,β-dimethyl-γ-butyrolactone, which for convenience will be referred to at times hereinafter as pantoyl lactone, is a compound of great commercial significance. Its importance is attributable to the fact that it is employed in the production of pantothenic acid derivatives. Processes for the production of pantoyl lactone are well known in the art. In one of these, isobutyraldehyde is condensed with formaldehyde in water solution in the presence of aqueous alkali cyanide. The amount of alkali cyanide employed in the process of the art is sufficient to form a mixture of formoisobutyraldol and, at the same time, provide for subsequent conversion of the formoisobutyraldol to its cyanohydrin. The cyanohydrin thus obtained is, thereafter, hydrolyzed to α-hydroxy-β,β-dimethyl-γ-butyrolactone. In another prior art process, glycolonitrile is reacted with isobutyraldehyde in the presence of an alkaline condensing agent, such as sodium hydroxide, potassium hydroxide, calcium hydroxide, etc., to produce formoisobutyraldol cyanohydrin. This compound is, in turn, converted by hydrolysis with acid into α-hydroxy-β,β-dimethyl-γ-butyrolactone.

While the prior art methods for producing pantoyl lactone have, for the most part, been proven to be satisfactory, the subsequent purification of the crude product thus obtained leaves much to be desired. In most cases, various glycols are formed as by-products of the condensation reaction. In order to eliminate these after the desired lactone has been formed, the strongly acidic reaction mixture must first be made strongly alkaline to convert the lactone to the alkali salt of α,γ-dihydroxy-β,β-dimethyl butyric acid. The alkaline mixture is thereafter subjected to steam distillation to remove therefrom all of the undesired glycols. After removal of the glycols is completed, the mixture is strongly acidified with a suitable acid to reconvert the alkali salt of α,γ-dihydroxy-β,β-dimethyl butyric acid to the lactone. The crude product can then be isolated by conventional prior art procedures and pantoyl lactone, in a highly refined state, ultimately obtained therefrom by fractional distillation.

Some of the prior art processes have omitted the step of eliminating glycols from the reaction mixture. As a result of this, the yields reported in such prior art processes appear to be quite high. They are substantially higher than they would have been if such glycols had been eliminated from the reaction mixture by steam distillation inasmuch as the glycols produced by the side reactions have, in many cases, boiling points which are substantially identical to the boiling point of the desired lactone. In the fractionation of the crude lactone, these glycols are carried over with the lactone and thus contaminate the final products. However, while the step of removing the glycol contaminants is of utmost importance to the quality of the final product, the necessity for subjecting the reaction mass to steam distillation is not without its disadvantageous features. In the first place, steam distillation is time-consuming and requires the use and maintenance of special and costly equipment. Moreover, steam distillation often results in discoloration of the crude product, even under carefully controlled conditions.

It is the object of this invention to provide an improvement in the process for producing α-hydroxy-β,β-dimethyl-γ-butyrolactone.

It is a more particular object of the invention to provide a method for obtaining consistently high yields of substantially pure α-hydroxy-β,β-dimethyl-γ-butyrolactone without subjecting the lactone to conventional distillation procedures.

It is a further object of the invention to provide a method for producing colorless α-hydroxy-β,β-dimethyl-γ-butyrolactone without subjecting the crude lactone to conventional distillation procedures.

Other objects of the invention will be obvious and will in part appear hereinafter.

It has been found that, when dilute alkali is mixed with crude pantoyl lactone which is dissolved in the organic solvent phase of a two-phase aqueous-organic solvent system, the alkali salt of α,γ-dihydroxy-β,β-dimethyl butyric acid can be obtained in the aqueous phase of the system substantially free of contaminants. The alkali salts thus obtained can be relactonized with acid and the lactone isolated by conventional prior art procedures.

In carrying out the process of this invention, crude aqueous pantoyl lactone is first preferably adjusted with alkali to within the range of pH 6.5 to pH 6.8. Thereafter, a water-immiscible organic solvent in which the lactone is soluble is added to the aqueous pantoyl lactone. The lactone and the organic solvent-soluble impurities, including the glycolic impurities, are taken up in the organic solvent. Water-soluble impurities present will remain largely dissolved in the water phase of the system. In the preferred embodiment of the invention, the water and the water-immiscible organic solvent are then separated. It has been found that the desired high yields are more readily reproduced from batch to batch when, at this point in the process, the lactone and the organic solvent-soluble impurities are extracted away from the water-soluble inorganic impurities which are present in the neutralized hydrolysis mixture. The aqueous solution, if it is separated from the organic solvent at this stage of the process, can be discarded. Thereafter, the lactone-containing organic solvent, whether separated or not from the contaminant-containing water phase, is treated with a dilute aqueous solution of a salt-forming alkali. The water-soluble alkali salt of α,γ-dihydroxy-β,β-dimethyl butyric acid, thus produced, is taken up in the aqueous phase of the two phase system. At this point, one may better appreciate why it is more desirable to separate the organic solvent phase from the aqueous phase prior to the saponification step. In the first place, by separating the immiscible organic solvent phase from the aqueous phase prior to the saponification step, any ammonium salt, as, for example, ammonium chloride, formed during the hydrolysis of the cyanohydrin with hydrochloric acid, present in the aqueous phase will be removed. The presence of this salt in the system during the saponification step would obviously necessitate the use of a quantity of alkali which is greater than that theoretically required to bring about the saponification of the lactone. The separation of the immiscible solvents at this stage permits the process to be carried out on a most economical basis since it will obviate the need of using excess alkali. However, separation of the two phases is important for still another reason. For when the water phase is separated from the organic solvent phase prior to saponification with dilute aqueous alkali, the alkali salt produced during the saponification reaction will be present in the aqueous phase of the newly created two phase system substantially free of both organic solvent-soluble and water-soluble impurities. When the immiscible solvent phases are not separated prior to saponification, the alkali salt at this stage of the process will be present in the aqueous phase of the system in admixture with water-soluble impurities. While these water-soluble impurities may be separated from the lactone during the extraction steps involved in the isolation of the lactone, it is far more practical and convenient to remove these impurities at the outset. When the saponification of the lactone is complete, the organic solvent phase and the aqueous phase of the two phase system are separated by appropriate means. The alkali salt of α,γ-dihydroxy-β,β-dimethyl butyric acid in aqueous solution can be relactonized with acid and isolated by conventional prior art procedures which will be described hereinafter.

In general, any alkali can be employed initially to adjust the crude aqueous pantoyl lactone solution to about pH 6.5 to 6.8. Thus, for example, sodium hydroxide, potassium hydroxide, sodium carbonate, potassium carbonate, sodium bicarbonate etc., can be employed. In the preferred embodiment, however, aqueous ammonia is used. However, the preliminary neutralization step can be omitted at this point in the process, if desired. Preliminary neutralization, however, lends greater versatility to the type of equipment that can be used in carrying out the process. For example, when the crude lactone is first neutralized, the process can be carried out in stainless steel equipment. Where the crude product is not neutralized at the outset glass-lined equipment should be employed. When the preliminary neutralization step is omitted, however, a sufficient quantity of alkali must be employed in the subsequent saponification step not only to form a salt with the lactone but also to neutralize other acidic residues present in the crude lactone solution.

Any water-immiscible organic solvent in which pantoyl lactone is soluble can be employed in the practice of this invention. Thus, for example, organic solvents, such as, methylene chloride, ethylene dichloride, isopropyl acetate, benzene, etc. can be used. The quantity of solvent used in carrying out the extraction is not a critical limitation on the practice of the invention. The amount of solvent used, however should be sufficient at least to extract completely the crude pantoyl lactone. Generally, several extractions will be carried out, using in each instance about one volume of organic solvent for each three or four volumes of aqueous pantoyl lactone solution.

Thereafter, the organic solvent extracts are combined into a single solution. This solution is used as is in the saponification step so that the step of isolating the lactone by evaporation of the solvent is not necessary. A quantity of aqueous alkali, at least sufficient to react with all of the pantoyl lactone present to form therewith the water-soluble alkali salt of α,γ-dihydroxy-β,β-dimethyl butyric acid, is added directly to the organic solvent solution of the lactone. Preferably, however, a small excess of alkali is employed. The saponification reaction is exothermic. It will proceed to completion readily without the application of external heat. While the saponification step can be commenced at temperatures at or near room temperature or higher, the reaction will proceed to completion even at much lower temperatures, as, for example, at temperatures as low as about 0° C. In the preferred embodiment of the invention, the saponification step is carried out below normal room temperatures, with external cooling being applied to maintain the internal temperature of the reaction mixture within the range of from about 10° C. to about 20° C. For the purposes of the present invention, any alkali which reacts with pantoyl lactone to form a water-soluble salt of α,γ-dihydroxy-β,β-dimethyl butyric acid can be used. Particularly useful are sodium hydroxide, potassium hydroxide, sodium carbonate and potassium carbonate. Sodium hydroxide, is, however, preferably employed. The concentration of the aqueous alkali solution employed in the saponification step is not particularly critical. A sufficient quantity of water should be present in or introduced into the system at the saponification stage to dissolve completely all of the water-soluble lactone salt formed by the reaction. Under ordinary circumstances, the saponification will be carried out employing an aqueous solution containing 5% to 20% by weight of alkali as the saponification agent. While greater or lesser quantities of water can be present during the reaction without departing from the scope of the invention, no practical advantage will be gained by the use of such quantities.

Following the saponification step of the process pantoyl lactone can be isolated from the mixed solvent system conveniently by means of conventional prior art procedures. Thus, for example, after saponification, the aqueous phase and the organic solvent phase which comprise the two phase system are first separated by some convenient means. In so far as the practice of this invention is concerned, the organic solvent phase, which contains contaminating side products of the condensation reaction, is of no practical importance and may be discarded. However, the contents of this soluiton will be discussed more fully hereinafter. The aqueous phase which contains the alkali salt of α,γ-dihydroxy-β,β-dimethyl butyric acid is treated with acid, for example, hydrochloric acid, to convert the salt to the lactone. Generally, a quantity of acid sufficient to reduce the pH of the solution to about pH 1.0 will be employed for this purpose. Thereafter, the aqueous solution is treated with an alkali, as for example, aqueous ammonia, to adjust the pH of the solution to about pH 6.5. The aqueous-pantoyl lactone mixture is then extracted with a water-immiscible organic solvent in which the lactone is soluble. Solvents, such as methylene chloride, ethylene dichloride, isopropyl acetate, benzene, etc. can be employed for this purpose. The lactone-containing organic solvent phase and the aqueous phase are separated, with the aqueous phase being discarded. Any water-soluble impurities that may have been present during the saponification and lactonization steps are removed at this point in the process with the separation of the aqueous phase from the organic solvent phase. The organic solvent solution of pantoyl lactone can thereafter, be washed with small amounts of aqueous sodium bicarbonate solution if necessary, to ensure neutrality and subsequently the solution can be dried over anhydrous sodium sulfate. The organic solvent is then removed by evaporation to yield pantoyl lactone. When crude pantoyl lactone is subjected to the process of this invention and isolated as suggested herein, consistently high yields of highly refined pantoyl lactone will be obtained.

In the immediately preceding paragraph, reference has been made to the organic solvent phase which contains the contaminating side products formed during the preparation of pantoyl lactone. Qualitative experimentation carried out in connection with this organic solvent solution showed that complete evaporation of the solvent, followed by warm water washes of the oily residue yielded a water-insoluble amber oil which spontaneously crystallized from organic solvent solution overnight at room temperature. The water-insoluble residue was found to be soluble in most organic solvents, including hydrocarbon solvents. Crystallization of the product was effected from hexane or diethyl ether at a temperature of 5° C. to obtain long, white needles having a melting point of 66.5° C. to 67.5° C. By a hydroxyl determination, the product was calculated to have a molecular weight of about 195, assuming the acetylation of a single hydroxyl group by the method of acetylation employed. Preparation of the p-nitrobenzoate derivative yielded a product having a melting point of 122° C. to 123° C. and a molecular weight, as determined by a saponification method, of 339. This again indicates a molecular weight of about 190 for the parent compound. A Kjeldahl determination showed the absence of nitrogen in the parent compound; a carbon and hydrogen analysis gave C=63.45; H=11.14. When the neutral parent compound was refluxed with alcoholic potassium hydroxide, no alkali was consumed, indicating the absence of a lactone or ester function in the molecular. Furthermore, the compound of melting point 66.5° to 67.5° did not respond to a test for unsaturation with bromine in carbon tetrachloride; tests for the presence of an aldehyde or ketone function were also negative.

As a further and more particular embodiment of this invention, it has been discovered that pantoyl lactone of inordinately light color can be obtained without the necessity of resorting to the distillation procedures of the prior art. In the past, undistilled or crude pantoyl lactone has been characterized by the presence of undesirable color bodies. Distillation of the crude lactone in vacuo has always been necessary to obtain a colorless product. It has now been found that when the condensation of isobutyraldehyde and aqueous formaldehyde in the presence of alkali cyanide, and the subsequent treatment of the product thus obtained with an acidic substance which is more acid than hydrocyanic acid, as, for example, hydrochloric acid as taught in the prior art, is carried out in a solvent medium comprising a mixture of water and water-miscible organic solvent, a homogeneous reaction system is obtained and undesirable side reactions are apparently moderated. When, as in the processes of the prior art, water is used as the sole solvent for the reaction, the reaction mixture is heterogeneous. The use of the water and water-miscible organic solvent mixture results in the production of water-white cyanohydrin. The use of water as the sole solvent for the reaction results in the production of a badly discolored cyanohydrin. In addition to this decided advantage, however, it has been found that unusually consistent results are obtained from batch to batch when the reaction mixture is homogeneous. This is in contrast to the erratic results obtained when the reaction mixture is heterogeneous. The reproducibility of results, from batch to batch, is an outstanding feature of the present invention. Moreover, it has been found that when the reaction system is homogeneous, it is far easier to exercise complete control over the rate of the reaction. In the homogeneous system, the heat generated by the reaction is slowly and gradually dissipated. On the other hand, however, in a heterogeneous reaction system, the rise in temperature is rapid and somewhat violent. As a result of this, the reaction can get out of hand very easily and total, or at least partial, loss of yield will result.

The water-white cyanohydrin, obtained by means of the use of the mixed solvent system, can be converted with acid to pantoyl lactone. This lactone can be purified by the method disclosed herein and isolated by conventional prior art procedures, as colorless pantoyl lactone. If, however, the same colorless cyanohydrin were to be converted to pantoyl lactone with acid and the lactone were to be purified by steam distillation, as taught in the prior art, and isolated by conventional methods, a discolored product would be obtained. Fractional distillation of the discolored crude product would be required to obtain a colorless pantoyl lactone. This, therefore, demonstrates the outstanding effectiveness both of using the mixed solvent system during the condensation reaction and of employing the purification process disclosed herein.

In carrying out this facet of the invention, any water-miscible organic solvent can be employed in admixture with water as the solvent for the condensation reaction. Preferably, however, polar solvents such as, low molecular weight aliphatic monohydroxy alcohols are used. These include, for example, methyl alcohol, ethyl alcohol, propyl alcohol, isopropyl alcohol, etc. In the preferred embodiment of the invention the cyanohydrin will be produced in a solvent system comprising a mixture of water and methyl alcohol. The ratio of water to water-miscible organic solvent in the mixture can vary within rather wide limits. In general, completely satisfactory results will be obtained when the organic solvent comprises from about 15% to about 65% of the weight of the water-organic solvent mixture. Preferably, however, an aqueous organic solvent mixture which contains from about 25% to about 50% by weight of water-miscible organic solvent will be used.

Many outstanding advantages flow from the practice of the present invention. Broadly, it permits one to obtain consistently high yields of pantoyl lactone which, without distillation, is exceptionally pure. Thus, for example, after saponification of the lactone with alkali in the two phase system, as disclosed herein, and subsequent relactonization of the salt thus produced, pantoyl lactone, which is completely acid-free, has been isolated in 96% to 97% purity. Fractional distillation of that product yielded acid-free, 97% to 98% pure pantoyl lactone. Since the crude lactone, prior to the purification process disclosed herein, is ordinarily only about 88% pure, the process of the invention is shown to be efficient and commercially feasible.

The invention is noteworthy also in that it provides a practical method for carrying out the production, purification and isolation of pantoyl lactone as a unit process. Pantoyl lactone is not, and need not be, isolated as such at any stage of the purification procedure. One need only take the crude aqueous lactone as prepared in the prior art, subject it to the alkaline saponification and extraction steps disclosed herein and eventually isolate the desired compound in highly purified form. The ease and facility with which the saponification of the lactone takes place, a factor which renders the process particularly adapted to large scale commercial production, is quite surprising. For while it is well known that pantoyl lactone is readily saponifiable with aqueous alkali, it was not anticipated that, when dissolved in the organic solvent phase of the two phase water-water-immiscible organic solvent system, saponification of the lactone under such conditions would proceed as rapidly as it does. In fact, it was to be expected that the saponification of the lactone under such conditions would be somewhat slow. The saponification reaction was, however, found to be far more exothermic than could have been anticipated. The remarkable ease with which the lactone ring was opened was evidenced by the fact that the lactone was completely saponified in a period of twenty minutes while dissolved in an organic solvent at a temperature of 0° C., even though only a 5% excess of a 5% aqueous alkali was employed. In addition, it has been observed that pantoyl lactone was quantitatively saponified at room temperature in a two phase water-water-immiscible organic solvent system in a period of about ninety seconds.

A further advantage of the invention resides in the fact that one can obtain consistently high yields of highly purified pantoyl lactone having inordinately light color. This, of course, is accomplished by carrying out the condensation of isobutyraldehyde and aqueous formaldehyde in the presence of alkali cyanide in a mixed solvent system, as described heretofore, and purifying the lactone thus obtained, as herein indicated. This method can be practiced efficiently and effectively as a unit process and, without distilling the product, pantoyl lactone (96% to 97% pure) having light transmission of 87% to 90% will invariably be obtained.

For a fuller understanding of the nature and objects of this invention, reference may be had to the following example which is given merely as a further illustration of the invention and is not to be construed in a limiting sense. All parts given in the example are parts by weight unless otherwise indicated.

*Example*

A solution of 232.0 parts of sodium cyanide dissolved in 500.0 parts of water was carefully added to a solution of 395.0 parts of aqueous formaldehyde (36% to 37%), 350.0 parts of isobutyraldehyde (97% to 98%) and 168.0 parts of commercial methanol, the latter solution having been previously chilled to a temperature of −5° C. During the addition, the solution was continuously stirred and the internal temperature of the reaction mixture was maintained between about 12° C. to 20° C. It required about two hours for the addition of the reactants within the temperature limits. The mixture was stirred for an additional sixty minutes after the addition had been completed.

The solution of the cyanohydrin thus produced was thereafter poured into 1080 parts of 37% hydrochloric acid. The acid used had been previously cooled to a temperature of about 0° C. When the reactants were admixed, the temperature of the mixture rose to within the range of from about 50° C. to about 55° C. The mixture was then heated on a steam bath for about three hours. At the end of that time, the solution was cooled to room temperature and adjusted to pH 6.5 to 6.8 with about 78.0 parts of 28% aqueous ammonia. The lactone and the organic solvent impurities were extracted from the solution as follows: 825 parts of methylene chloride was added to the solution and stirred therewith. The methylene chloride solution was then separated from the aqueous phase. This procedure was repeated three times using, in each instance, 620 parts of methylene chloride. The aqueous reaction mixture was then extracted an additional time using 613 parts of methylene chloride. The methylene chloride extracts were then combined.

To these combined stirred extracts, 315.0 parts of 50% by weight of aqueous sodium hydroxide and 738 parts of water were added slowly. The solution was maintained at an internal temperature of from about 25° C. to about 32° C. by means of the use of an ice bath. The solution was allowed to stir for a period of about thirty minutes after the addition was complete. Thereafter, the methylene chloride phase and the water phase were separated.

The aqueous alkaline phase was adjusted with about 432 parts of 37% hydrochloric acid to pH of about 1.0. The solution was then heated on a steam bath for about ninety minutes. It was then cooled to room temperature and neutralized with 27 parts of aqueous ammonia to pH 6.5 to 6.8. The lactone was thereafter extracted from the aqueous solution by a sequence of methylene chloride extractions using 831 parts, 620 parts (two times), 612 parts, and 428 parts of methylene chloride. The aqueous solution was then saturated with 100.0 parts of sodium chloride and once again extracted using 410 parts of methylene chloride. The extracts were then combined and dried over anhydrous sodium sulfate.

Evaporation of methylene chloride yielded 386 parts of α-hydroxy-β,β-dimethyl-γ-butyrolactone, 97% pure, no free acid and transmission 90%. These results were readily reproduced in a subsequent number of runs.

This product was distilled at 105° C. (5 mm.) returning 349 parts of pantoyl lactone, 97.5% pure, no free acid, transmission 100%. A comparison of the analysis of the undistilled produce and the distilled products indicates that a highly refined product was obtained by the process of the invention, even without distilling same.

Having described my invention, what I claim as new and desire to secure by Letters Patent is:

1. A process for the production of substantially colorless undistilled α-hydroxy-β,β-dimethyl-γ-butyrolactone which comprises condensing isobutyraldehyde with formaldehyde in a solution consisting essentially of a mixture of water and methanol in the presence of aqueous alkali cyanide in an amount sufficient to form a mixture of formoisobutyraldol and at the same time provide cyanide ions requisite for subsequent conversion of said formoisobutyraldol to its cyanhydrin, thereafter adding a water soluble acidic substance more acid than hydrocyanic acid substantially to neutralize the reaction mixture and promote said conversion to cyanhydrin, hydrolyzing with a water soluble acid said cyanhydrin to crude α-hydroxy-β,β-dimethyl-γ-butyrolactone, adjusting with alkali the aqueous methanol mixture of crude lactone to a pH 6.5 to 6.8, adding thereto an inert water-immiscible organic solvent in which the crude lactone is soluble thereby forming a two phase system with water and methanol as one phase and lactone and said water immiscible organic solvent as the other phase, separating the aqueous-methanol phase of the mixture from the water-immiscible organic solvent phase, adding to the organic solvent phase without the application of external heat a quantity of dilute aqueous alkali sufficient at least to react with the lactone to produce the alkali salt of α,γ-dihydroxy-β,β-dimethyl butyric acid and to form a two phase system with water and said organic solvent as the phases separating the water phase of the mixture from the water-immiscible organic solvent phase, adding hydrochloric acid to the water phase and heating same at an elevated temperature, the quantity of said hydrochloric acid being sufficient at least to convert said salt to the pure lactone.

2. The process of claim 1 wherein the dilute aqueous alkali employed is sodium hydroxide.

3. The process of claim 1 wherein the dilute aqueous alkali employed is potassium hydroxide.

4. The process of claim 1 wherein the dilute aqueous alkali employed is aqueous ammonia.

5. A process for the production of substantially colorless, undistilled α-hydroxy-β,β-dimethyl-γ-butyrolactone which comprises condensing isobutyraldehyde with formaldehyde in a solution consisting essentially of a mixture of water and an inert water-miscible organic solvent in the presence of aqueous alkali cyanide in an amount sufficient to form a mixture of formoisobutyraldol and at the same time provide cyanide ions requisite for subsequent conversion of said formoisobutyraldol to its cyanhydrin, thereafter adding a water soluble acidic substance more acid than hydrocyanic acid substantially to neutralize the reaction mixture and promote said conversion to cyanhydrin, hydrolyzing with a water soluble acid said cyanhydrin to crude α-hydroxy-β,β-dimethyl-γ-butyrolactone, dissolving the crude lactone in an inert water-immiscible organic solvent, adding thereto without the application of external heat a quantity of aqueous alkali sufficient at least to react with the lactone to produce the alkali salt of α,γ-dihydroxy-β,β-dimethyl butyric acid and to form a two phase system with water and said organic solvent as the phases, separating the water phase of the mixture from the water-insoluble organic solvent phase, adding a quantity of a water soluble acid to the water phase and heating same at an elevated temperature, the quantity of acid added sufficient to convert said salt to the pure lactone.

6. The process of claim 1 wherein the water-immiscible organic solvent employed is methylene chloride.

References Cited in the file of this patent

UNITED STATES PATENTS

| | | |
|---|---|---|
| 2,439,905 | Pickel et al. | Apr. 20, 1948 |
| 2,443,334 | Van House | June 15, 1948 |
| 2,503,200 | Ham | Apr. 4, 1950 |
| 2,852,530 | Ford | Sept. 16, 1958 |
| 2,863,878 | Lynn | Dec. 9, 1958 |

UNITED STATES PATENT OFFICE
CERTIFICATE OF CORRECTION

Patent No. 3,024,250                                March 6, 1962

Howard C. Klein

It is hereby certified that error appears in the above numbered patent requiring correction and that the said Letters Patent should read as corrected below.

Column 5, line 5, for "molecular" read -- molecule --; column 7, line 59, for "produce" read -- product --.

Signed and sealed this 4th day of September 1962.

(SEAL)
Attest:

ERNEST W. SWIDER
Attesting Officer

DAVID L. LADD
Commissioner of Patent